United States Patent [19]

McKee et al.

[11] Patent Number: 4,838,661

[45] Date of Patent: Jun. 13, 1989

[54] LIQUID CRYSTAL LIGHT EMITTING DISPLAY SYSTEM

[75] Inventors: John M. McKee, Coral Springs; Marilyn S. Burger, Pompano, both of Fla.

[73] Assignee: Motorola, Inc., Schaumburg, Ill.

[21] Appl. No.: 141,015

[22] Filed: Jan. 5, 1988

[51] Int. Cl.[4] .............................................. G02F 1/13
[52] U.S. Cl. ............................... 350/345; 350/339 D; 350/337
[58] Field of Search ............................ 362/31, 32, 26; 340/716; 350/345, 339 D, 337

[56] References Cited

U.S. PATENT DOCUMENTS

| | | | |
|---|---|---|---|
| 3,950,078 | 4/1976 | Zatsky | 350/337 |
| 4,042,294 | 8/1977 | Billings et al. | 350/345 |
| 4,088,992 | 5/1978 | Kmetz et al. | 350/345 |
| 4,142,781 | 3/1979 | Baur et al. | 350/345 |
| 4,364,640 | 12/1982 | Krüger | 350/345 |
| 4,405,210 | 9/1983 | Baur et al. | 350/345 |
| 4,516,834 | 5/1985 | Cascini | 350/339 D |
| 4,716,501 | 12/1987 | McKee et al. | 362/31 |

OTHER PUBLICATIONS

Bechtler et al., "Dim Light is No Turnoff for Fluorescence—Activated LCD", Electronics, pp. 113–116, Dec. 8, 1977.

Ashley, "Razzle Dazzle Plastic" Popular Science, Apr. 1986, pp. 100–101.

Hecht et al., *Optics*, p. 81, Addison Wesley Pub. Co., 1974.

Mobay Chemical Corp. Provisional Information Sheet.

Bayer AG, KU Group, D—5090 Leverkusen Brochure "A Little Light Goes a Long Way with LISA".

*Primary Examiner*—Stanley D. Miller
*Assistant Examiner*—Nopoleon Thantu
*Attorney, Agent, or Firm*—Vicent B. Ingrassia; Anthony J. Sarli, Jr.

[57] ABSTRACT

A liquid crystal light emitting display (LCLED) device having two modes of operation. In the first mode the LCLED device produces dark symbols on a light background. In the second mode the LCLED device emits light producing light symbols on a dark background. The LCLED includes a LCD cell having an optically active nematic liquid crystal composition interposed between two parallel glass substrates. The glass substrates having transparent electrode indicia on the inner surfaces. Disposed on the outer surfaces of the glass substrates are polarizers having their axes of polarization orthogonal in the first mode, and their axes of polarization parallel in the second mode. A transparent panel having indicia identical to the electrode indicia is disposed on the exterior of one of the polarizers. The transparent panel is comprised of transparent material having fluorescent dye stuff. The transparent panel is optically connected to a light collecting means. In the second mode, the light collecting means absorbs light from an illumination means and internally reflects the light to the transparent panel indicia. The transparent panel indicia is comprised of a plurality of depressions which intercepts the internally reflected light and emits the light in the shape of the transparent panel indicia, through the LCD cell tot he viewer, thus permitting light against a dark background.

13 Claims, 3 Drawing Sheets

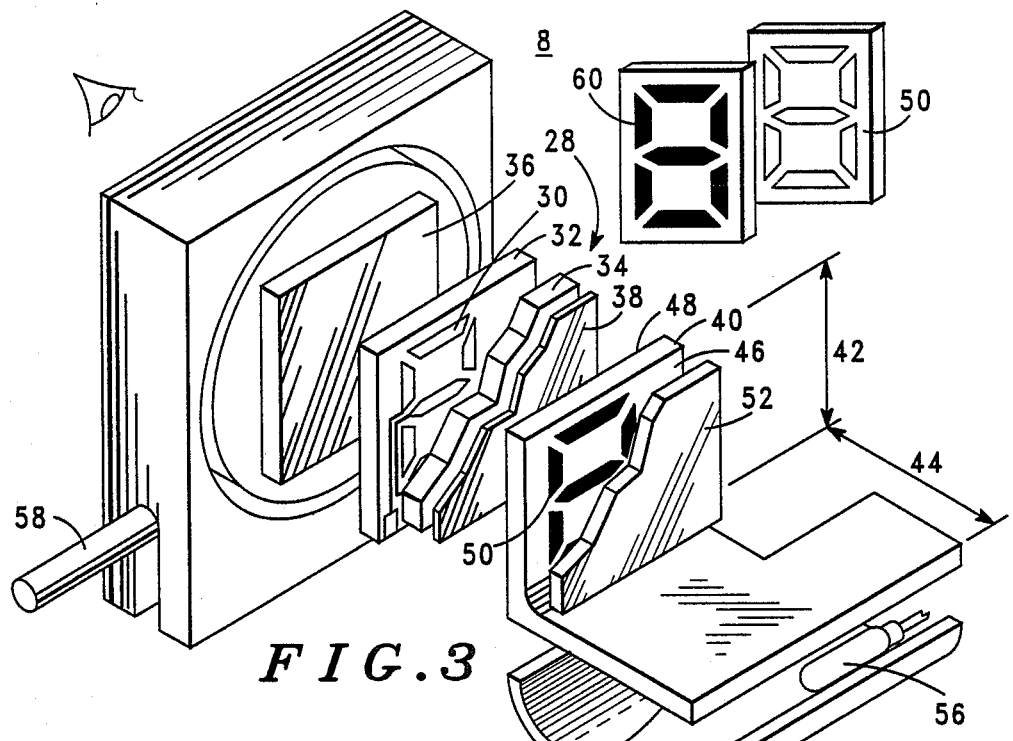
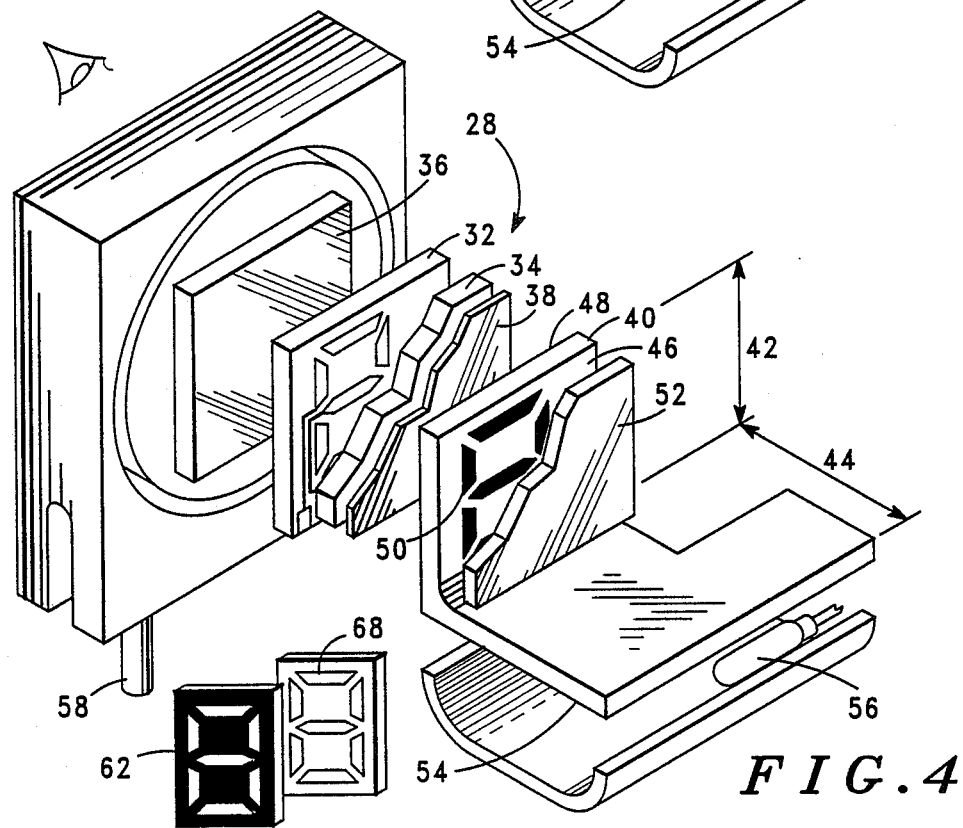

LIQUID CRYSTAL LIGHT EMITTING DISPLAY SYSTEM

BACKGROUND OF THE INVENTION

1. Field of the Invention

The present invention relates to electrical optical displays, especially for displays which are based on the principal of the twisted nematic (TN) liquid crystal cell, and in particular, to a nematic liquid crystal display (LCD) apparatus which provides viewing conditions ranging from bright sunlight to totally dark conditions.

2. Description of the Prior Art

To begin, it would be beneficial to briefly review the construction and operation of a typical twisted nematic (TN) LCD. Heretofore, field effect LCD cells, such as those of the TN type, have been constructed typically as follows. Referring to FIG. 1, a liquid crystal material 10 having a positive dielectric anisotropy is interposed between an upper 12 and a lower 14 parallel glass substrate, with the molecules of the liquid crystal material parallel with the upper and lower substrates and twisted 90 degrees therebetween. Such an LCD cell is disposed between a pair of polarizers (16 and 18) with polarizing axis intersecting with each other at right angles. With this typical construction, light impinging upon a device is first polarized linearly by one of the polarizers 18, then its polarized plane is rotated 90 degrees by the liquid crystal's molecules in a twisted arrangement, and finally, light transmits through the other polarizer 16 to be observed by viewer 20. Where transparent electrodes 19 formed with a pattern of a letter, digit, or other symbols are disposed on the inner surface of the upper and lower substrates, and are impressed with a voltage greater than the threshold voltage of the device, the liquid crystal molecules will be arranged in substantially the vertical direction or in the direction of the field. Under these conditions, the polarized plane of incident light will not be rotated by the liquid crystal molecules. Thus, the incident light will be intercepted by the second polarizer 16 creating a dark symbol on a light background. The pattern thus can be displayed by controlling the direction of the liquid crystal medium within the LCD cell to yield the transmission or interception of the light.

While this type of arrangement has worked well in sunlight, in darkness, the typical LCD device has been difficult to see. To solve this problem in darkness, typical LCD devices are illuminated with additional light to permit the viewer to see the display. This can be accomplished by flooding the LCD with light from the front to back. However, lighting the LCD under dim or dark conditions requires additional electronics and increases current usage to illuminate the display.

Continuing with our example of the typical TN LCD, in some cases, only light from the viewer's side id available. Referring to FIG. 2, there is shown a side view of a TN LCD device of FIG. 1. In order to achieve a good contrast in a LCD device operated by reflection, a reflector 22 with high reflective capacity and also with suitable diffuse scattering power is situated beneath the lower polarizer to reflect the light from the viewer side back to the viewer's eye, 20.

Having discussed the basic operating properties of a TN LCD, it is important to briefly describe its uses. With the advance of technical innovation, the use of LCDs has grown. LCD have significant advantages over light emitting diodes in that they essentially act as a capacitor and consume almost no power. For this reason, LCDs are being used in watches and as readouts for handheld computers, electronic games or small portable devices.

In the design of electronic equipment, the general intent has been to reduce the overall size of the equipment. This is particularly true in the selective call radio paging receiver market where recently designed "pagers" are now available that can be carried in a shirt pocket. Such a design typically includes a rectangular parallelpiped plastic housing that includes a single printed circuit board with appropriately attached electronic components. The housing is typically not much wider than the thickness of the printed circuit board and components. Therefore, if a visual display is to be installed on a pager, a low profile assembly is usually required. To achieve this low profile assembly the additional lighting to illuminate the LCD under dim conditions requires considerable mechanical design work.

Although older paging receiver designs convey the received message to the user mainly upon receipt, recently developed paging receiver designs store a received message in the pager for later retrieval by the user. Therefore, it becomes necessary to inform the user that a message has been received. This is typically accomplished by sounding an alert tone, flashing light, actuating a vibrator, or in the case of a digital display pager, causing a predetermined symbol to appear on the paging receiver's display. If a visual indication of the message is desired, the current drain of the light source becomes critical because paging receivers typically have very limited battery capacity. Therefore, to reduce battery drain while maintaining the output light intensity at an acceptable level, it would be desirable to provide a visual display that minimizes the amount of current drain from the battery while maintaining adequate leigibility of the message on the display under all viewing conditions.

To insure adequate legibility, there must be adequate visual contrast between the alphanumeric characters that comprise the message and the background against which they are viewed. To achieve adequate legibility, the following conditions are usually followed.

Under normal illumination conditions (i.e. where the viewer does not have to be dark adapted), dark characters are used against a light background. However, where the viewer must maintain a dark adapted condition, light characters on a dark background are preferable. Thus, from the standpoint of the viewer, a positive image (i.e.; a dark image on a light background) is preferred when the display is used under normal or bright ambient light conditions. A negative image (i.e. a light image against a dark background) is preferred under dim-not or blackout ambient lighting conditions, because it is desirable to reduce the amount of light that could affect the viewer's dark adaption level. Thus, it would be highly desirable for a portable electronic equipment subject to bright ambient lighting conditions or blackout ambient lighting conditions to provide a positive or a negative image of the LCD characters on the LCD device.

SUMMARY OF THE INVENTION

The present invention has been developed for the purpose of overcoming the problems of prior art twisted nematic LCD device systems. Accordingly, the invention has as its object a method and device for providing a positive image of the liquid crystal generated display images under normal or bright ambient lighting conditions, and a negative image display of the characters when the LCD device is under dim-out or blackout ambient lighting conditions.

Another object of the present invention is to generate an illuminated pattern for a twisted nematic type LCD using a minimum amount of battery energy.

Another feature of the present invention is to provide a positive or negative image LCD display for a small portable communication receiver using a minimum of components and battery energy.

In general the liquid crystal display device of the present invention comprises a liquid crystal display cell, first and second polarizers, a first transparent panel and a light collecting means comprised of the same material as the first transparent panel. The liquid crystal display cell has two opposed transparent substrates each having at least one electrode deposited on the interior surface. The electrode has a display indicia such as a seven segment display. A layer of liquid crystal material comprised of an optically active nematic liquid crystal composition is included between the transparent glass substrates. The first and second polarizers are disposed on the exterior surfaces of the transparent glass substrates. One of the polarizers has a rotable axis of polarization capable of being rotated from a position where the axis of polarization of the two polarizers are substantially orthogonal to a position where the axis of polarization are substantially parallel. The transparent panel is adjacent the second polarizer and has a display indicia corresponding in shape and spatial alignment to the electrode display indicia. The panel is composed of an optically transparent material when the axis of polarization of the two polarizers are substantially orthogonal. In this mode the liquid crystal display device produces dark indicias on a light background. In a second mode an illumination device illuminates the light collecting means which are optically connected to the first transparent panel. Light collected by the light collecting means is internally reflected to the first transparent panel where the display indicia is comprised of a plurality of depressions which intercept the internal reflected light and emit the light back through the liquid crystal display cell. When the display indicia of the first transparent panel is illuminated the axis of polarization of the two polarizers are substantially parallel to permit the viewer to observe illuminated segments of the liquid crystal display cell.

In particular, the plurality of depressions of the transparent material are comprised of cone like depressions. The cone like depressions intercept the internally reflected light of the transparent material and maximize the emitted light from the opposite surface. Thus, in the negative image mode the viewer will observe light emitting characters against a dark background.

BRIEF DESCRIPTION OF THE DRAWINGS

FIG. 3 is an exploded perspective view of an LCD device for generating a positive image of an LCD character.

FIG. 4 illustrates an LCD device for generating a negative image of an LCD character under dim-out or blackout ambient lighting conditions.

DETAILED DESCRIPTION OF A PREFERRED EMBODIMENT

Figure 1:
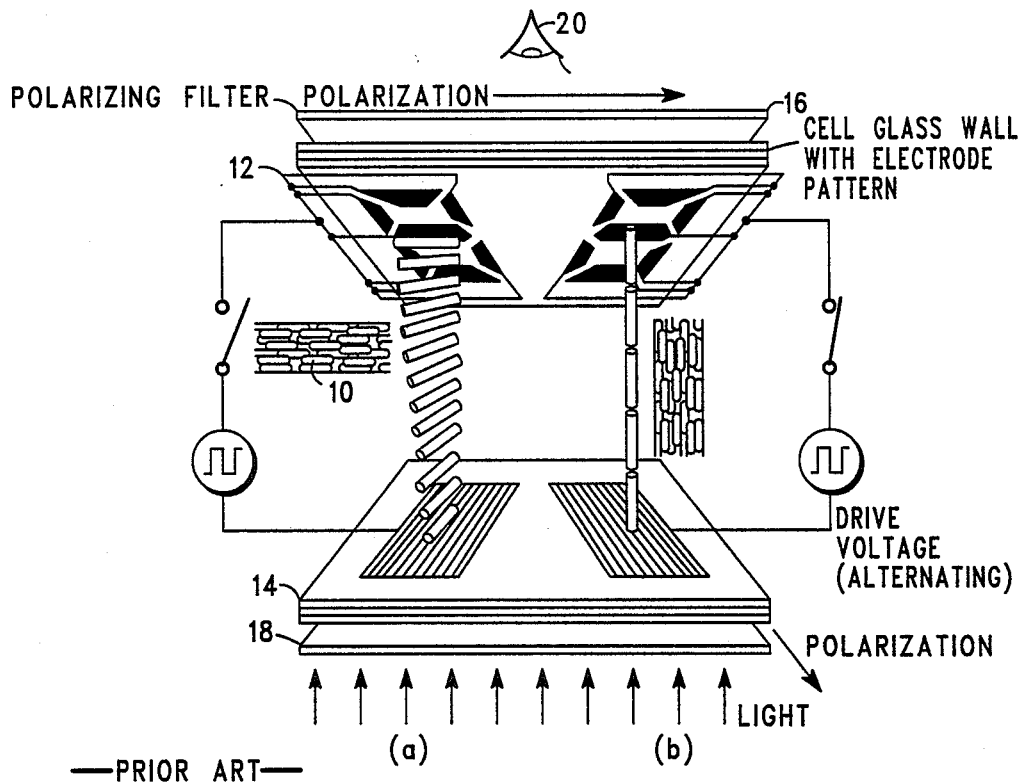
FIG. 1 illustrates a typical twisted nematic LCD device.
Figure 2:
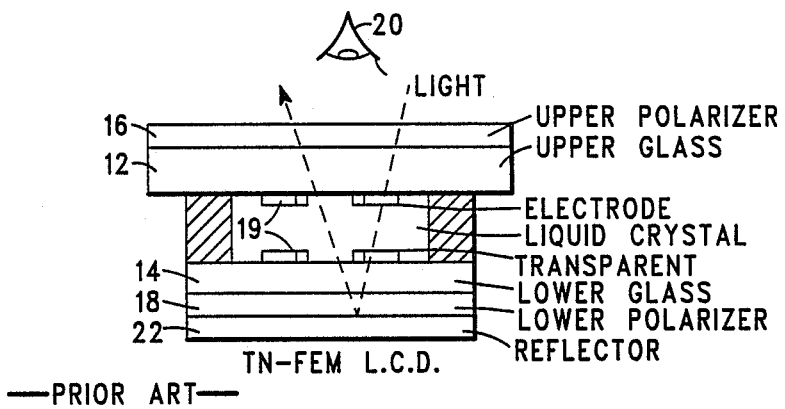
FIG. 2 shows a reflector for a typical LCD device when only front face illumination is available.

FIG. 3 shows an exploded perspective view of a translucent LCD device 8 incorporating the various features of the invention. The element are shwon exploded away as though they were separate elements. It will be understood, however, that these elements are physically coupled together to form a unified display device.

The LCD device 8 of FIG. 3 includes a LCD cell 28 comprising a liquid crystal material having a positive dielectric anisotropy interposed between a first 32 and a second 34 parallel glass substrate with the molecules of the liquid crystal material parallel with the first second glass substrates and twisted 90 degrees therebetween. Disposed between the first and second glass substrates are transparent electrodes which have a display portion 30 which visually defines the shape of one or more indicia. The visual display indicia are defined by means of conductive, light transmitting electrodes deposited on the inner surfaces of the substrate (i.e. the surface exposed to the liquid crystal solution deposed between the substrates).

For the purposes of the present invention, the term "indicia" encompasses and includes, but is not limited to, range marks, bars, bar sections, numerals, letters, symbols, icons, or any other form of visual indications. The numerals or letters need not be of a continuous nature, in fact, the numerals may be of the well known 7-segment type in which selective energization of the segments and various combinations produces numerals from zero to 9, or the alphanumeric type which produces alphanumeric characters. For clarity and brevity the remaining discussion will reference a seven segment display as an indicia.

Continuing with the explanation of FIG. 1, the LCD cell 28 is disposed between a first polarizer 36 and a second polarizer 38 which, in the positive image mode, has polarizing axes intersecting with each other at right angles. Either polarizers 36 and 38 are capable of being rotated such that the polarizing axes are substantially parallel. For clarity, FIG. 3 is illustrating showing the first polarizer 36 capable of being rotated such that the polarizing axis is substantially parallel to the polarizing axis of second polarizor 38. It is understood however, that polarizer 38 can be rotated for effecting substantially parallel polaring axes.

Positioned adjacent second polarizer 38 opposite the LCD cell 28, is a first panel 42 of a transparent material 40 which is characterized by the fact that in one mode (transmissive mode), it is capable of transmitting substantially all (90% or more) of any ambient light which enters LCD cell 28 from the front and passes through the second polarizer. In a second mode, the transparent material 40 absorbs ambient light in a light collection surface such as second panel 44 and emits it as long wavelength fluroscent light on face 48 in the first panel 42. Face 48 is adjacent second polarizer 38. Etched or milled into face 46 opposite face 48 of the transparent material 40 is a pattern 50 defining generally the same shape of the segments of the optically transparent segment defining electrodes 30 of the LCD cell 28 and being optically aligned with the electrodes 30 of the liquid crystal display cell 28. The pattern 50, shown also in full form, is comprised of a plurality of depressions such as cones, milled into the surface 46. The density of the cones are dependent upon the intensity desired and the shape of the indicia.

The transparent material 40 is comprised of a light intensifying plastic in which dye transparent polymers within the material have special optical properties. The transparent material 40 absorbs direct or diffused light from the environment, transforms it to longer wavelength, and emits it as a fluorescent light. Essentially, the transparent material 40 is constructed preferably from a transparent polycarbonate, although other transparent materials having special dye stuffs may also be suitable. The material includes a fluorescent material, preferably a low molecular weight polymer dye stuff. Sheets of various plastics containing such fluorescent dye stuffs are available from the Mobay Chemical company and are known as "LISA" plastics. "LISA" is an abbreviation for the German word "lichtsammeln" which means "light collecting". The LISA plastics absorb ambient light and emit it as long wavelength fluorescent light. The outstanding characteristics of LISA material is that it follows the principles of total internal reflection. That is, if light is traveling in a media that is a higher index of refraction than that of the enviroment, and the light encounters a boundary between the median and environment, the light will be totally reflected at the boundary if the angled incident exceeds the critical angle. The angle of incidence and the critical angle are measured from a line drawn perpendicular to the boundary surface. A further explanation of the LISA material operating in the LCD device is given with reference to FIG. 5.

To briefly summarize, the transparent material 40 is comprised of the first panel 42 and a light collecting means such as the second panel 44. The first panel 42 has parallel faces 48 and 46, face 48 being adjacent the second polarizer 38. The second panel 44 extends from the LCD cell to form a light collecting surface 54 being illuminated by an illumination device such as an incandescent bulb 56. The second panel 44 may project at any angle A from the first panel 42. The angle A may range from 0 degrees to the critical angle (CA) for reflecting the internal light in the transparent material 40. The critical angel CA is calculated from the formula $CA = \arcsin(Ne/Nm)$, where Ne and Nm are the indexes of refraction of the environment and the transparent material 40 in which the light is traveling. As is evident, angle A can be chosen to satisfy the particular mechanical design of the apparatus using the LCD device.

Finally, a reflector 52 is adjacent face 46 to reflect light from the front of the liquid crystal display device 8. It is understood, however, that reflector 52 is needed only for light available from the viewer's side. As is well know, reflector 52 is not necessary if light is incident from the back.

The LCD device 8 is capable of operating in a positive image mode (dark idicia on a light background) and a negative image made (light indicia on a dark background). In the positive image, mode, light impinging upon the device is first polarized linearly by the first polarizer 36. Its polarized plane is rotated 90 degrees by the liquid crystal's molecules in a twisted arrangement, and finally, light transmits through the second polarizer 38. Where transparent electrodes 30 formed with a pattern of a letter, digit or other symbol are disposed on the inner surface of the glass substrates 32 and 34, and are impressed with the voltage greater than the threshold voltage of the device, liquid crystal molecules are arranged in substantially the vertical direction or in the direction of the field. Under these conditions, the polarized plane of incident light will not be rotated by the liquid crystal molecules thus the incident light will not be intercepted by the second polarizer 38. The light passes through the transparent material 40 and is reflected back from the reflector 52 to the viewer. Thus, if all the indicias for a seven segment display of the cell are energized, the display 60 as shown in FIG. 3 will be apparent to a viewer of the liquid crystal display device.

Referring to FIG. 4, there is shown the LCD device 8 for the negative image mode. In this mode, the first polarizer 36 has its axis of polarization rotated at least 90 degrees. It being understood that the axis of polarization of the second polarizer 38 could be rotated at least 90°. The axis can be rotated 90° by mechanical means, such as lever 58, or by other mechanical or electromechanical means which are well known to those of ordinary skill in the art. In addition to rotating the first polarizer 90°, the transparent material 40 is illuminated on light collecting surface 54 by illumination device 56. The transparent material 40 absorbs the incident light on the surface 54 and internally reflects the light to the first panel 42. The milled pattern 50 breaks the total reflection inside the transparent material and the reflected light caused by the milling will leave the transparent material as from face light on surface 48. The front face light will be formed in the same indicia pattern as the optically transparent electrodes indicia 30.

The front face light from the transparent material passes first through the second polarizer 38 and is intercepted by the optically transparent electrodes defining the indicia form elements on the glass substrates 32 and 34. Where transparent electrodes formed with the pattern of letter, digits, or other symbols are disposed on the inner surfaces of the glass substrates 32 and 34, and are impressed with the voltage greater than the threshold voltage of the device, the liquid crystal molecules are arranged in substantially the vertical direction or in the direction of the field. Under these conditions, the polarized light from polarizer 38 are not rotated by the liquid crystal molecules. Where the electrodes are not impressed with the threshold voltage the liquid from second polarizer 38 is rotated 90 degrees. The first polarizer 36 will intercept and block the light that is rotated 90 degrees, but will allow the unrotated light to be transmitted to the viewer. Where the light emitted from the transparent material 40 is not intercepted by the first polarizer 36, a pattern is displayed controlled by the direction of the liquid crystal medium within the liquid crystal display cell 8 to yield a transmission or an interception of a light. The outstanding characteristic of the device is that the device does not require the segments to be energized in an opposite direction as that for the positive image. That is, the electronics for generating the display are the same for the positive image mode as is the negative image mode.

Thus, in the negative image mode, if all the segments for a seven segment display of the cell are energized, the display pattern 62 will be apparent to the viewer. In other words, illuminated segments against a dark background. As is evident in the negative image mode the LCD device is an illuminating pattern device, emitting light from the LCD cell.

Figure 5:
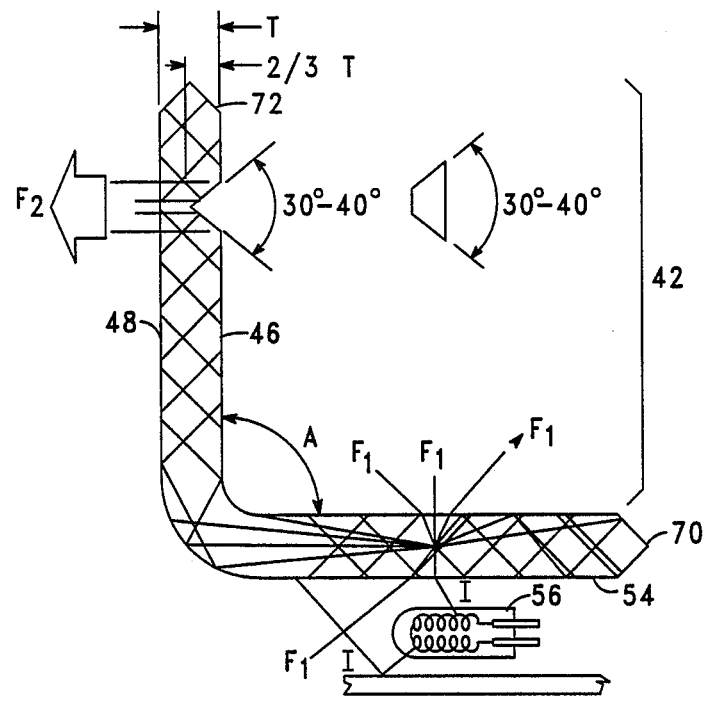
FIG. 5 is a side view of the light emitting material used for illuminating a negative image display.

To completely understand the operation of the present invention, it is necessary to explain the operation of the translucent material comprised of the LISA plastic. Referring to FIG. 5, there is shown a side view of the transparent material having a first panel 42 and a second panel 44. The incident light "I" is generated by the illumination device 56 when the liquid crystal device is in the negative image mode. According to the highter reflective index of the plastic material, the environment light "I" is refracted on the surface of the plastic sheet. A part of the light is then absorbed by the dye stuff comprising the LISA plastic. after $10^{-9}$ second, the absorbed light energy is emitted as fluorescent light at random in the plastic sheet. The part of the emitting light which reaches the surface of the plastic/air medium with a smaller angle than the total reflection angle, is reflected and leaves the sheet through the surface F1. The rest of the emitting light is totally reflected, collected, and transmitted through the translucent material in the general direction of the first panel 42 as long as an angle A does not exceed the critical angle for the Lisa plastic. The fluorescent light contained in panel 42 is redirected as front face light $F_2$, leaving the surface 48 by a plurality of depressions on the back surface 46 of the material. The depressions are formed by milling, etching, or the like. The milling breaks the total reflection of the fluorescent light and the milling causes the fluoresent light to leave the material as front face light $F_2$. As a result, brightness is obtained at the surface 48 from the milling. To increase the brightness, all surfaces of the transparent material are polished. The edges are shaped for effecting total reflection of the light and the edge. For example, edges 70 and 72 have no corners which are less than the critical angle of the transparent material. The light collection of the material is explained due to the fact that the area (surface 54) which absorbs the light is larger than the milling area which emits the fluorescent light.

The milling can be accoplished in a variety of manners. The milling can be a dimpled pattern or, as Applicant has discovered, can be cone shaped to maximize the emitting fluorescent light from surface 34. In practice, applicant has discovered that the maximum amount of light can be emitted if the cone 64 is drilled into the surface to approximately 67% of the thickness of the panel 42. The slant of the side of the cone can range from 30° to 40° to maximize the emitted light. Applicant has also discovered that a truncated cone shape 66 can also provide the necessary emitted light. It is important to point out that the indicia is formed on the surface 42 by a plurality of depressions. For example referencing briefly to FIG. 4., there is shown panel 42 with a plurality of depressions 68 formed with indicias for a seven segment type LCD display. It is important to note that when illumination device 56 is extinguished, the LISA material allows light to be transmitted through the material and to be reflected back by reflector 52 to the viewer with little degradation in light intensity.

Figure 6:
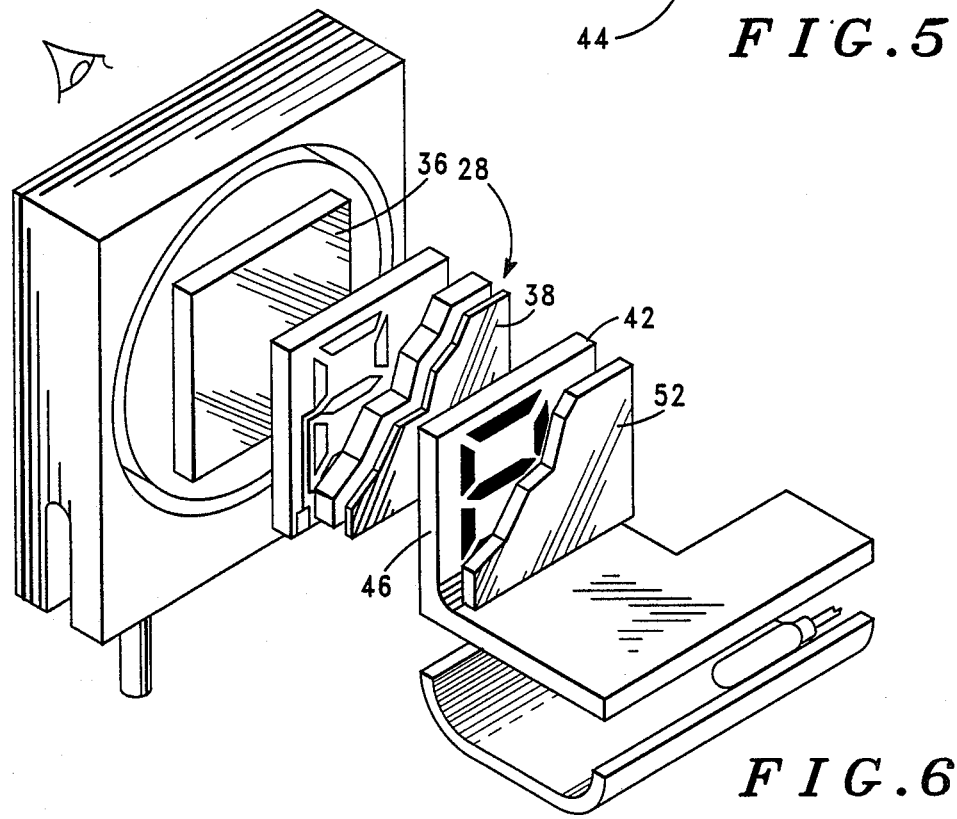
FIG. 6 illustrates the addition of a diffuser to the liquid crystal display device of the present invention to increase the legibility of the liquid crystal display pattern for positive imaging.

Referring to FIG. 6 there is shown a second embodiment of the present invention. In this embodiment a diffuser 76 is interposed between the second polarizer 38 and the first transparent panel 42. In the positive image mode, the diffuser acts to diffuse the dimple effect caused by the plurality of depressions in the face 46 of the first transparent panel 42. Without the diffuser in the positive image mode, the viewer would be able to detect a slight darken coloration caused by the plurailty of depressions in the transparent material 42. However, with the diffuser, the slight loss of light caused by the plurality of depressions is diffused to give a uniform background for the liquid crystal display cell.

Thus, there has been shown an LCD device and method which permits a positive image mode (dark image on a light background) to be displayed under normal or bright ambient lighting conditions. Under dim-out or blackout ambient lighting conditions, a negative image mode (i.e. a light image against a dark background) is generated The outstanding characteristic is that in the negative image mode the LCD device emits light from the segments and therefore requires no additional backlighting.

While this invention has been described with reference to various illustrative embodiments, it is not intended that this description be construed in a limiting sense. There are modifications of the illustrative embodiments as well as other embodiments in the invention which will be apparent to a person skilled in the art upon reference to this description. It is therefore contemplated that the appended claim will cover any such modifications and embodiments as fall within the true scope of the invention.

What is claimed is:

1. A liquid crystal display device comprising:
   a liquid crystal display cell including two opposed transparent substrates, each having at least one electrode deposited on the interior surface thereof, a layer of liquid crystal material being an optically nematic liquid crystal composition, the electrode having a display indicia:
   a first and a second polarizer disposed on the exterior surfaces of the substrates, one of the polarizers having a rotatable axis of polarization capable of being rotated from a position where the axes of polarization of the two polarizers are substantially orthogonal to a position where the axes of polarization are substantially parallel; and
   a first transparent panel adjacent the second polarizer having a display indicia corresponding in shape and spatial alignment to said electrode display indicia, the panel being comprised of an optically transparent material optically connected to a light collecting means wherein said first transparent panel display indicia are illuminated from light illuminating said light collecting means when the axes of polarization of the two polarizers are substantially parallel, said first transparent panel display indicia being comprised of a plurality of cones cut into an exterior surface of the first transparent panel, the cones intercepting internally reflected light to emit light from the interior surface of said first transparent panel, wherein the slant in the side of each of said plurality of cones ranges from 30 degrees to 40 degrees.

2. The liquid crystal display device of claim 1, wherein said light collecting means includes a second transparent panel having a light collecting surface comprised of the optically transparent material of said first transparent panel, the second transparent panel being connected to said first transparent panel, and further wherein an illumination means illuminates said light collecting surface.

3. The liquid crystal display device of claim 2, wherein said light collecting surface comprises a substantially planar surface.

4. The liquid crystal display device of claim 2, wherein said illumination means is an incandescent light bulb.

5. The liquid crystal display device of claim 2, wherein said first transparent panel and second transparent panel are comprised of light collecting 6. The liquid crystal display device of claim 5, wherein the first transparent panel and second transparent panel are connected such that any light traveling in the light material is totally reflected at any boundary between the light collecting material and that of the environment.

7. The liquid crystal display device of claim 1, wherein each cone is truncated and cut into the first transparent panel's exterior surface.

8. The liquid crystal display device of claim 1, further comprising a reflector adjacent the exterior surface of said first transparent panel to reflect light transmitted from said first transparent panel back through said first transparent panel.

9. The liquid crystal display device of claim 8 further comprising a diffuser for diffusing light passing through it, wherein the diffuser is interposed between said second polarizer and said first transparent panel.

10. A liquid crystal display device comprising:
a liquid crystal display cell including two opposed transparent substrates each having at least one electrode deposited on the interior surface thereof, and a layer of liquid crystal material being an optically nematic liquid crystal composition, the electrode having a display indicia;
a first and a second polarizer deposed on the exterior surface of the substrates, one of the polarizers having a rotatable axis of polarization capable of being rotated from a position where the axes of polarization of the two polarizers are substantially orthogonal to a position where the axes of polarization are substantially parallel; and
a first transparent panel adjacent the exterior surface of the second polarizer and having a display indicia corresponding in shape and spatial alignment to said electrode display indicia, the first transparent panel comprised of a trasparent material operating in a transmissive mode and an illuminative mode, the transmissive mode permitting transmission of substantially all light entering the liquid crystal display cell and passing through the second polarizer and the illuminative mode illuminating the first transparent panel display indicia;
wherein said transparent material is in the transmissive mode when the axes of polarization of the polarizers are substantially orthogonal and wherein said transparent material is in the illuminative mode when the axes of polarization of the polarizers are substantially parallel, said first transparent panel display indicia comprised of a plurality of cones forming the same configuration as the electrode display indicia on the exterior surface to intercept the internally reflected light for emitting the light through the second polarizer and into the liquid crystal display cell, each of said plurality of cones having a slant in the range of 30 degrees to 40 degrees.

11. The liquid crystal display device of claim 10, wherein the illuminative mode of the material is comprised of a second transparent panel having a light collection surface being illuminated to absorb light being internally reflected to the first transparent panel to be emitted as light.

12. The liquid crystal display device of claim 11, further comprising a diffuser interposed between said second polarizer and said first transparent panel to enhance the contrast of the liquid crystal display cell.

13. The liquid crystal display device of claim 12, further comprising a reflector adjacent the exterior surface of the first transparent panel to reflect light from the first transparent panel to enhance the contrast of the liquid crystal display cell.

* * * * *